United States Patent Office 3,426,478
Patented Feb. 11, 1969

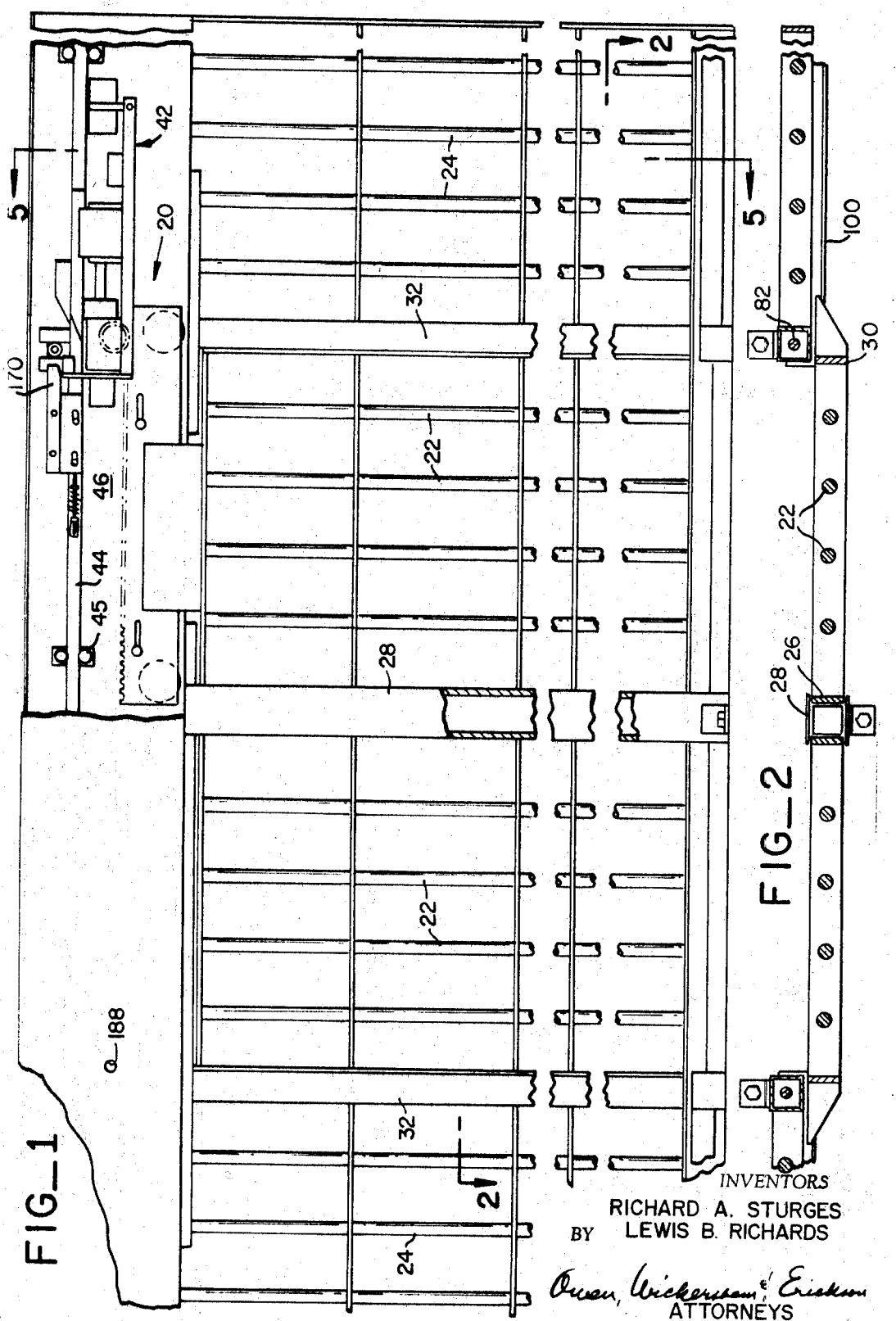

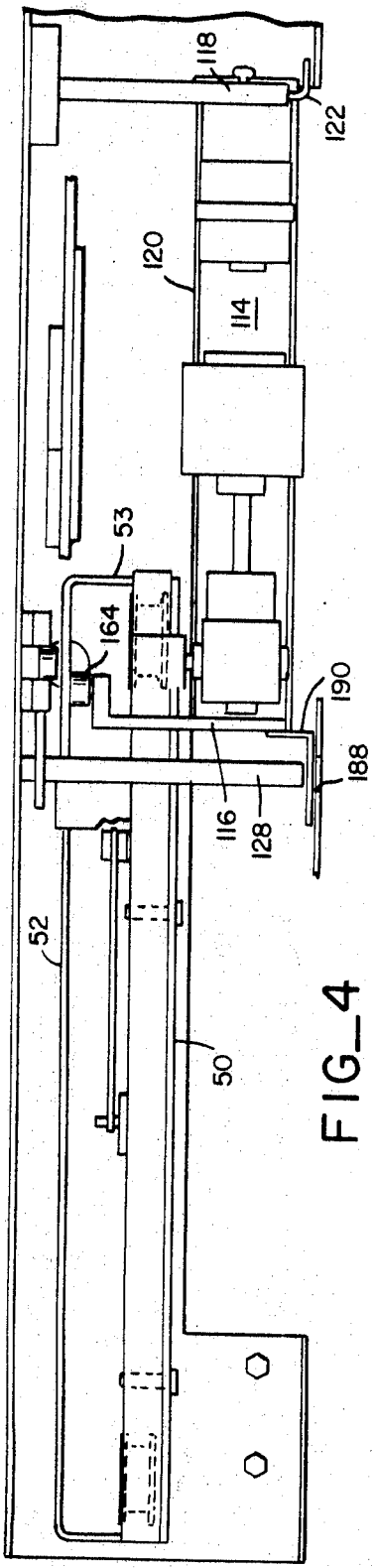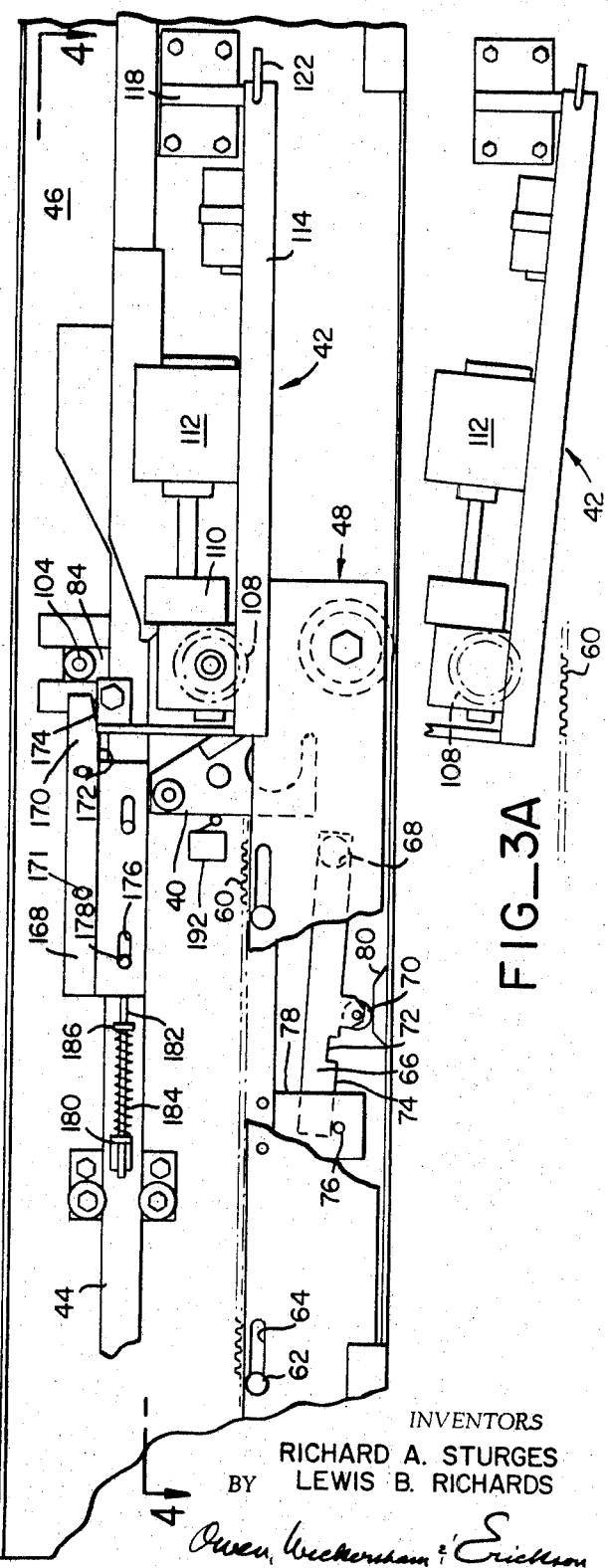

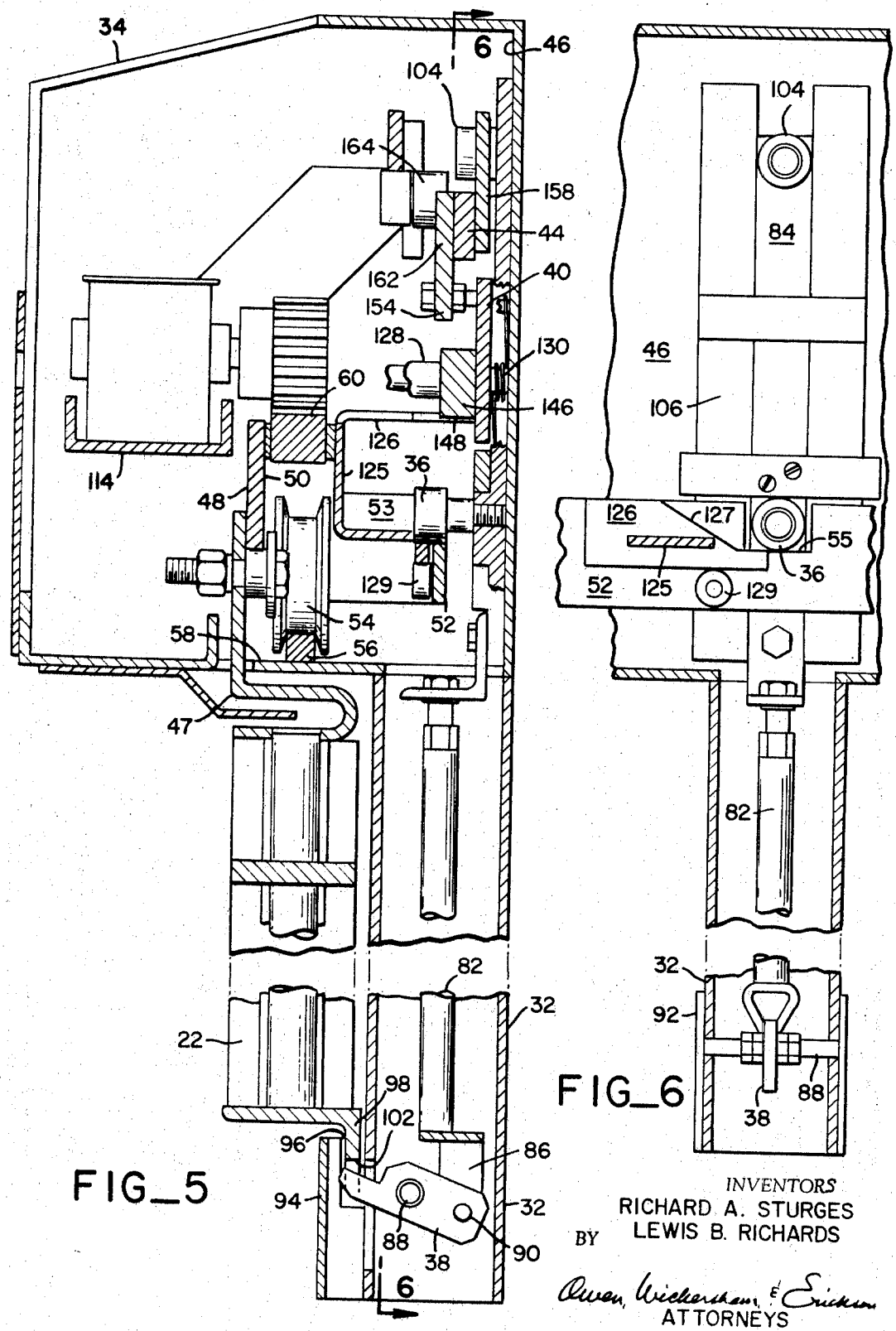

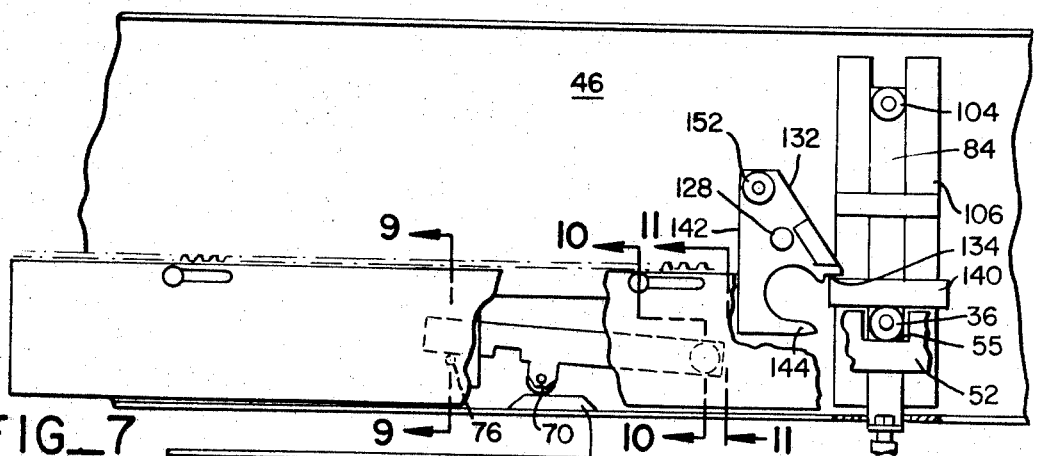
FIG_7
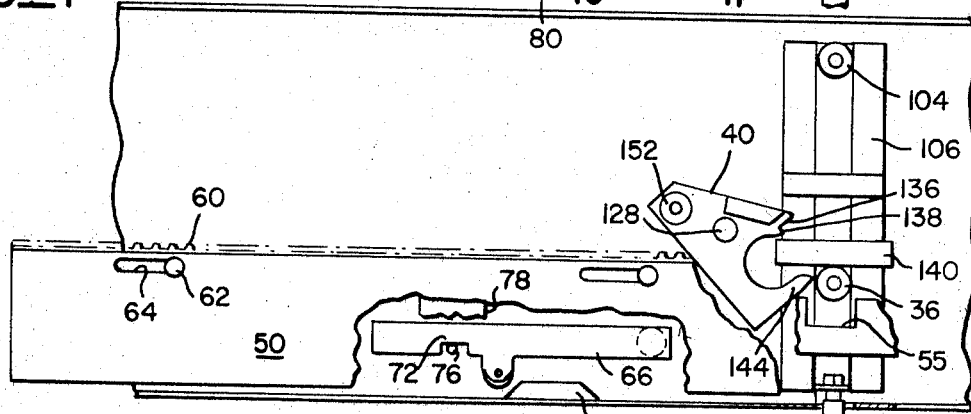
FIG_8
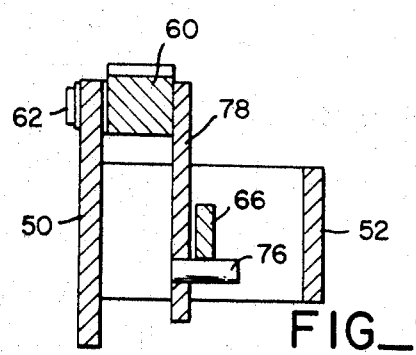
FIG_9
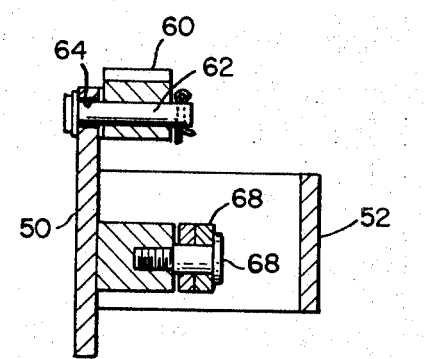
FIG_10
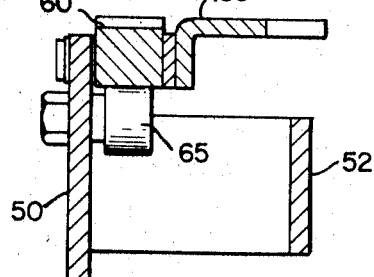
FIG_11

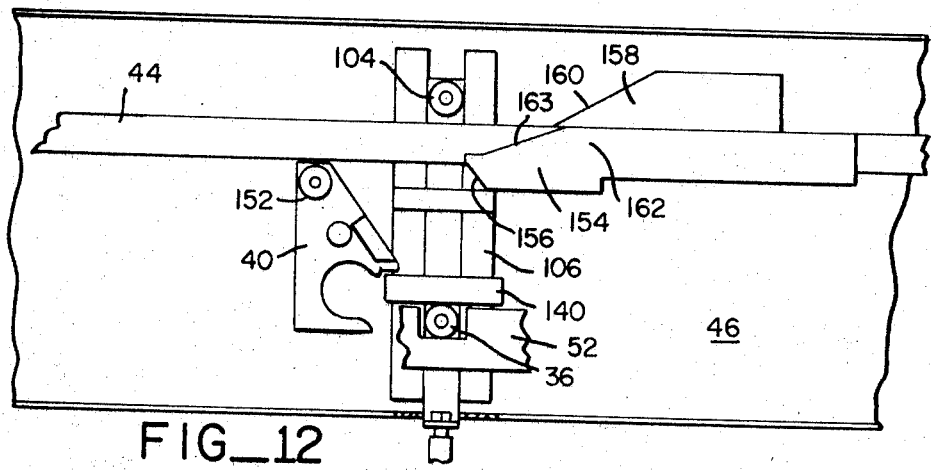
FIG_12
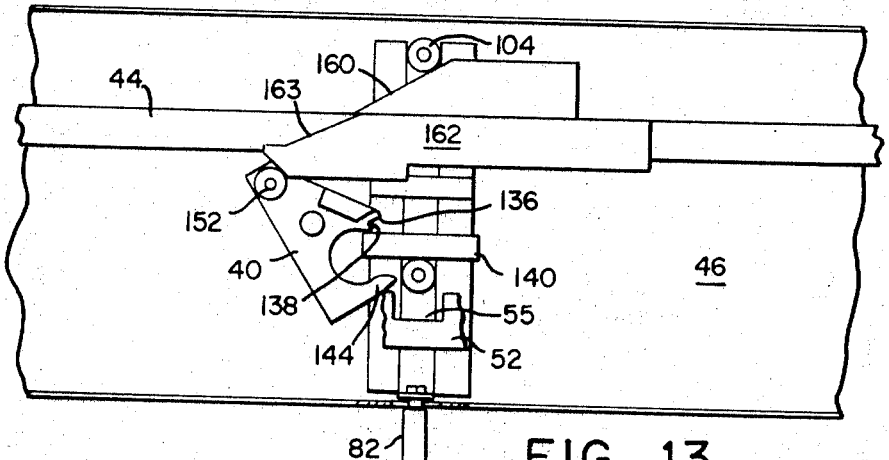
FIG_13
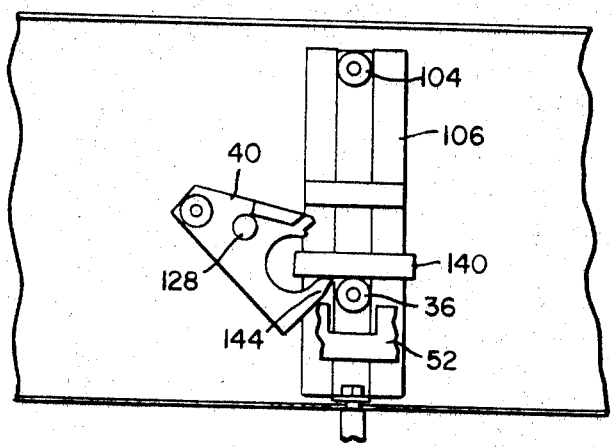
FIG_14
INVENTORS
RICHARD A. STURGES
BY    LEWIS B. RICHARDS
ATTORNEYS

3,426,478
JAIL LOCKING SYSTEM
Richard A. Sturges, Fremont, and Lewis B. Richards, Oakland, Calif., assignors to The Herrick Corporation, Hayward, Calif., a corporation of California
Filed Sept. 6, 1966, Ser. No. 577,280
U.S. Cl. 49—16                       22 Claims
Int. Cl. E05c 13/08; E05b 47/00; E06b 5/00

ABSTRACT OF THE DISCLOSURE

A system for operating from a remote control station one or more of a plurality of doors along a corridor comprising a mechanism for each door located within a housing above the door, and a movable release bar extending from the remote control station through each housing. Each mechanism includes a reversible drive means for moving the door linearly from an open to a closed position, a vertical locking column adjacent each door containing a vertically movable locking and bolt means in each housing fixed to the locking head and engageable with the door below to hold it in the closed position. A pivotal deadlock means is provided for preventing vertical movement of the locking head when the door is closed, thereby preventing the bolt means from being unlocked by external tampering. A cam actuator means on the movable release bar is operable to pivot the deadlock means and operate the locking head to open all doors of a group simultaneously.

---

This invention relates to a system for operating and locking one or a plurality of linear moving doors for a group of cells arranged in a row as in jails or prisons.

In large, multi-cell prison installations, although each cell door has its own lock, it is necessary that a door operating system be provided to open and close the cell doors either individually or in unison. Such a system must be controllable from a remotely located operating station and it must function so that the doors can also be opened manually in emergencies. In systems heretofore attempting to fulfill the aforesaid requirements an emergency release bar extending from the remote operating station along the entire row of doors of an installation was utilized to provide for simultaneous actuation of all the door locking bolts. Such emergency release bars were also used for disconnecting the electrical or mechanical drive means for each door to facilitate manual operation thereof.

However, one problem with such systems using release bars in the aforesaid manner arose due to the expansion and contraction of the bar under varying temperature conditions. This problem became particularly acute for arrangements involving a relatively large number of cells that required an unusually long release bar (e.g., several hundred feet). In such installations a substantial linear expansion of the bar often occurred due to environmental temperature changes, and in the prior art devices this expansion was sufficient either to completely disrupt the operation of the locking mechanism of individual doors or to make operation of the system difficult and its adjustment complicated and expensive.

Therefore, one object of the present invention is to provide an improved door operating and locking system for multicell arrangements in prisons and the like which overcomes the aforesaid as well as other problems. More specifically, an object of our invention is to provide an improved door operating and locking system utilizing a release bar operable from the remote control station which functions to unlock an upper bolt for each door and simultaneously, a lower foot bolt; to remove a deadlock for each door; to disengage the drive means for each door; and to expose an exterior keyhole for each door that provides access with a key for manually disengaging the deadlock and the locking bolt for the door—all without being affected by the expansion or contraction of the release bar due to temperature changes, even though the release bar may be unusually long to accommodate a large number of cells. This object of our invention is accomplished by an arrangement of elements which eliminates fixed mechanical connections with the release bar so that its expansion or contraction and hence its actual position is not highly critical to the functions of bolt locking, of drive mechanism disengagement and the exposure of a keyhole opening for manual operation. Our arrangement thus provides smoother operation and is free from problems of jamming, thereby affording greater reliability and requiring less maintenance.

Another object of our invention is to provide a remotely controllable and manually operable door opening and locking system for a multiple jail cell installation which provides a high level of locking security including bolts at both the upper and lower ends of the door, and moreover a system which is tamperproof as well as being mechanically reliable under all operating conditions.

A further object of the present invention is to provide a multiple door operating and locking system in which a unique deadlock is provided for each door to prevent the actuation of the door locking bolts even if excessive tampering should somehow provide access to them. In our system, this deadlock in its locking position prevents the vertical travel of a locking head having an upper bolt and a connecting rod to which is attached a lower bolt. It is retained in its normal locking position by a spring or gravity load and is disengaged either by movement of a drive rack in normal electric operation or by a release bar or by a manual key in manual operation. When the deadlock is operated manually it in turn actuates the regular door bolts and thereby provides a dual function.

Still another object of the present invention is to provide an improved multi-door operating and locking system for a plurality of cells that is particularly easy to service and maintain with a minimum of labor and without the need for special tools. More specifically, it is an object to provide a drive motor assembly for each door of a group of cells that is arranged as a tight, compact unit which can be quickly and easily removed and replaced when necessary. This feature is important because loss of facilities for any substantial periods of time while repairs are being made cannot be tolerated in most prisons where security conditions exist.

Other objects, advantages and features of the present invention will become apparent from the following detailed description presented in conjunction with the accompanying drawings, in which:

FIG. 1 is a fragmentary view in elevation with portions broken away to show a door operating and locking system according to the present invention;

FIG. 2 is a view in section taken along line 2—2 of FIG. 1;

FIG. 3 is an enlarged view in side elevation and in section showing our door operating and locking system in greater detail;

FIG. 3a is a fragmentary view similar to FIG. 3 showing the motor drive unit in the disengaged position;

FIG. 4 is an enlarged plan view in section taken along line 4—4 of FIG. 3;

FIG. 5 is a further enlarged fragmentary view in section taken along line 5—5 of FIG. 1;

FIG. 6 is an enlarged fragmentary view in section taken along line 6—6 of FIG. 5;

FIG. 7 is a fragmentary view in elevation showing the door carriage and rack operating cams when the door is in the closed and locked position;

FIG. 8 is a view similar to FIG. 7 with the gear rack extended to its entire lost motion position during normal operation with the deadlock and the upper bolt in the unlocked position;

FIG. 9 is a view in section taken along line 9—9 of FIG. 7;

FIG. 10 is a view in section taken along line 10—10 of FIG. 7;

FIG. 11 is a view in section taken along line 11—11 of FIG. 7;

FIG. 12 is a fragmentary view similar to FIGS. 7 and 8 showing the deadlock when in the locked position and the emergency release bar in its normal position;

FIG. 13 is a fragmentary view in side elevation showing the deadlock and the upper bolt in the unlocked position with the emergency release bar fully actuated; and FIG. 14 is a fragmentary view showing the deadlock position when operated manually by a key after the emergency release bar has been partially actuated.

With reference to the drawing, FIG. 1 shows a remotely controllable door actuating and locking system 20 embodying the principles of the present invention. To save space we have illustrated only a portion of a typical jail cell arrangement utilizing our door system wherein a purality of cells are arranged in a row along a corridor. Although this is perhaps the most likely application for the present invention it will become apparent that the system and its various features could be applied in other installations where it is desired to control either one or more of a plurality of doors from a remote station. As shown, each cell has a side moving jail type door 22 adjacent to a fixed wall section 24. The door and wall sections shown have the typical bar or grille construction, but they could be fabricated in other ways within the scope of the invention. In each cell the side moving door is offset from the fixed wall so that it can move parallel to it when the door is opened. When the door is closed, one vertical end edge 26 fits within a channel portion of a fixed divider post 28 and its other vertical end edge 30 is adjacent and locked to a locking column 32 (see FIG. 2). Above each movable door is a completely closed housing 34 that contains components of the door driving and locking system 20 for the particular door below. The system is controllable from a remote station (not shown) that may be located at the end of a row of cells.

In our system each door 22 is locked by both an upper bolt 36 and a lower bolt 38 and in addition, a deadlock 40. A motor drive assembly 42 for each door is located within its housing above and provides the power for opening and closing it. Extending from a remote control station (not shown) through each of the aforesaid housings for a row of cells is an emergency release bar 44 that is operable to release completely the locking bolts 36 and 38 and the deadlock 40 on all the cells simultaneously or to disengage the drive motor assembly 42 for each cell and make the locks thereof accessible for manual unlocking with a key. Within each housing the release bar is supported between pairs of roller guides 45 attached to the rear wall 46 of the housing.

Each door of our system, as seen in FIGS. 3-5, is provided with a hanger 47 that is attached to the upper end of a door frame member and extends upwardly into the housing where it is attached to a carriage 48. The latter comprises a pair of connected, spaced apart members 50 and 52, the first of which is essentially a rectangular plate that supports a pair of flanged, rotatable wheels 54 near its opposite ends. These wheels ride on a track 56 comprised of a narrow straight strip of material that is secured to the inside bottom surface 58 of the elongated housing 34 above the door.

The second carriage member 52 is essentially a longitudinal plate with end flanges 53 that connect it to the ends of the first carriage member 50 and retain it parallel to and spaced from the first carriage member 50. Near one end this second carriage member 52 has a notch 55 within which the upper locking bolt 36 fits when the door 22 is locked in the closed position. It is readily seen that when the bolt 36 is seated within the notch 55 the carriage 48 and thus the door 22 cannot be moved laterally but must remain in the closed position.

A gear rack 60 is attached to the carriage 48 by a lost motion connection that enables it to travel a predetermined short distance relative to the carriage. As shown in FIG. 10 a pair of stud members 62 are fixed to and project from the side of the rack 60 and slidably fit with a pair of transverse and longitudinally extending slots 64 located near the upper edge of the carriage member 50. The length of the slots is relatively small (e.g., 2 inches), but provides sufficient movement to enable the rack to perform some unlocking functions before causing the carriage, and hence the door, to move.

The rack is also partially supported for smooth movement on the carriage by a pair of rollers 65 that extend beneath it and are supported by the first carriage member 50 at spaced apart locations thereon (see FIG. 11). During most of the door opening and closing travel the rack is directly locked to the carriage by a movable rack locking arm 66 that is pivotally connected at one end 68 to the carriage member 50. Attached to the rack locking arm at a distance from its pivotal end and extending below it is a rotatable cam follower 70. Adjacent the latter follower on the opposite side of it from the pivotal end is a shoulder forming a notch 72 beyond which the arm has an extended portion with a substantially straight lower edge 74. The notch 72 is adapted to receive a locking stud 76 fixed to a bracket 78 that is attached to and extends below the rack 60 (see FIG. 9). On the bottom of the housing 34 at a location aligned with the cam follower 70 in the direction of door movement is a fixed cam actuator 80. When the door is in the closed position, the cam actuator is located so that the cam follower 70 rides on it and holds the arm in its "up" position, disengaged from the rack locking stud 76. As the rack moves initially relative to the carriage during the door opening procedure, the rack stud moves toward a seating engagement within the notch 72 of the locking arm and this seating is fully accomplished when the cam follower 70 rolls down from the cam actuator 80 and the locking arm 66 is urged by its own weight to pivot downwardly as the carriage is picked up and moved by the rack. The rack stays locked to the carriage when the door is opened and during most of the travel of the closing movement. During the end of the closing movement the cam follower 70 engages the actuator 80 and the rack locking arm is moved upwardly to release the rack from the carriage and allow it to move to the full extent of its lost motion travel.

Within the upright hollow locking column 32 located between the movable door 22 and the fixed wall or grille section 24, is a vertically movable connecting rod 82 having a locking head 84 at its upper end and a foot lock member 86 at its lower end.

As shown in detail in FIGS. 5 and 6, the foot lock includes the lower bolt 38 which is pivotally attached near its midpoint to a transverse pin 88 which is journaled at opposite sides of the locking column. The inner end 90 of the pin is pivotally connected to the lower end of the connecting rod 82. Fixed to the aforesaid opposite sides and covering the ends of the pin 88 are a pair of reinforcing plates 92 that extend beyond the inside vertical surface of the locking column and are covered by a front plate 94. The extended portions of the plates 92 are cut out to provide upwardly open, rectangular slots 96 which serve as a guiding means for a longitudinal flange 98 extending downwardly from the bottom edge of the door 22. After passing through the slots 96 the bottom door flange is further guided by an upwardly turned flange 100 on the bottom of the adjacent fixed grille section 24 (see FIG. 2). When the foot lock bolt 38 is in the locking position with the connecting rod downwardly extended, its forward portion extends outside the locking column and into a slot 102 which is provided near one end of the lower door flange 98 and is aligned with the bolt 38 when the door is fully closed. Although a door operating and locking system could be built according to the principles of our invention without a bottom door bolt, the latter provides greater securinty and, as seen, is readily actuated simultaneously with the upper bolt.

At the top of the connecting rod 82 in the locking column, the locking head 84 attached thereto comprises an upwardly extending bar on which are mounted two vertically spaced apart cam followers 36 and 104. The lower cam follower on the head 84 serves as the upper bolt, and when the door is fully closed and the connecting rod is in the down position, the lower cam follower or upper bolt 36 is seated in the notch 55 located near the end of the door carriage member 52. The locking head 84 supporting the cam followers 36 and 104 is slidably retained between a pair of parallel, spaced apart, vertical guide members 106 that are fixed to the rear housing wall 46.

The motor drive assembly 42 which provides the power for moving the door 22, as shown in FIG. 3, includes a drive pinion 108 which meshes with the gear rack 60 on the door carriage 48 and is driven through a gear box 110 by a reversible electric motor 112. The motors for all of the doors are electrically connected in the conventional manner and on each door the motor is turned off automatically by either one of a pair of switches that are located in the housing and are actuated by the door carriage when it arrives at either its door open or door close position. In order to conserve space, none of the wires, switches or other electrical components have been shown since they may be conventional in every respect and in themselves do no contribute to the novelty of the present invention. This entire motor drive assembly comprising the aforesaid pinion, gearbox and motor is mounted on a support plate 114 which is pivotally connected to a hanger 118 that is fixed to the rear inside wall 46 of the housing. This hanger extends horizontally outwardly from the housing wall and has a lower projecting portion which forms a bushing and fits between a pair of opposite, upright side walls 120 of the support plate 114. A pin 122 is journaled at opposite ends in the side walls and extends through the hanger bushing and retained in place by some suitable means. The entire motor drive assembly which is mounted on the support plate can thus be quickly disconnected from the hanger 118 and removed from its housing by sliding the pin 122 from its mounting in the support plate walls 120 and the hanger bushing portion.

With particular reference to FIGS. 5 and 8, we will now proceed to describe the bolt actuating or unlocking elements of our door operating system 20. Fixed by a bracket 125 near one end of the gear rack 60 is a cam actuator member 126 that is horizontally aligned with and has a sloped surface 127 that engages the lower cam follower or upper bolt 36 on the locking head 84 of the vertical connecting rod 82. When the door is to be opened the rack is moved initially without moving the carriage and the cam member 126 engages the upper bolt 36 and moves it and the entire connecting rod upward, thereby releasing both the upper and lower lock bolts 36 and 38 for the door. A roller 129 fixed to the carriage member 52 is located beneath and supports the cam member 126 to assure smooth operation. As the rack moves horizontally a farther amount, the stud members 62 seat at the ends of their slots 64 and the rack locking arm 66 is engaged so that the carriage is moved along its track to open the door. When the door is to be closed, the motor is reversed and the rack and carriage are moved in the opposite direction, and when the cam member 126 disengages from the upper bolt 36, the connecting rod 82 drops by gravity and places both the upper and lower bolts in their locking positions.

When the door 22 is closed with the bolts 36 and 38 in locking position the locking head is held down by the deadlock 40. This important feature of our invention operates when the door is closed to provide further tamper-proof locking security. As shown in FIGS. 7 and 8, the deadlock is a block that is pivotally mounted on a shaft 128 fixed within the housing 34 near the locking head 84. The pivotal axis of the shaft is above the center of gravity of the block so that it will always tend to assume the same relative position when at rest. A spring 130 attached to the shaft and the housing also serves to urge the deadlock into a normal down and locking position. Near its lower end the deadlock has a leading edge surface 132 that slopes downwardly toward the locking head and terminates at a retaining notch 134 having a horizontal surface 136 and a vertical surface 138, preferably at right angles to each other. With the deadlock in its locking position, the horizontal notch surface 136 extends over the top of, and its other surface 13 is located adjacent to, one end of a cross bar 140 that is fixed horizontally to the locking head 84. If the deadlock is rotated about its axis when the locking head is down in the locked position, the corners of the notch surfaces 136 and 138 will clear and move ahead of the cross bar thereby enabling the locking head to follow the deadlock upwardly into an unlocked position. However, if any upward force is exerted by the connecting rod 82 when the cross bar is within the notch 134 before the deadlock has been moved, the latter will merely jam the cross bar and prevent upward movement of the locking head. Thus, unless the deadlock is rotated ahead of the cross bar, the locking head cannot move to unlock the bolts. Below the aforesaid notch 134 and extending toward the locking head from a trailing edge surface 142 of the deadlock is a projecting finger portion 144 having a tapered cam surface near its end. This finger portion is long enough so that it engages the underside of the cross bar 140 when the deadlock is pivoted about its shaft 128 counterclockwise, as shown in FIG. 14.

Along the sloped leading edge surface 132 of the deadlock is a portion 146 projecting laterally from its side having a lower surface 148 that is generally horizontal when the deadlock is in the locking position. When the rack is moved initially to engage the locking head, this latter surface 148 is aligned with and thus engaged by another cam actuator member 150 attached to and extending upwardly from the rack near the same end thereof as the cam actuator 126. Thus, as shown in FIG. 8, engagement of the cam member 150 and the surface 148 pivots the deadlock out of its locking position during the normal door opening operation.

Attached to the deadlock above its shaft 128 is another cam follower 152, which will rotate the deadlock from its locking position when it is engaged by a first cam actuator member 154 that is fixed to the emergency release bar 44 (see FIG. 12). When the release bar is moved horizontally by a control at the remote station (not shown), a sloped cam surface 156 of the first cam actuator member 154 engages the cam follower 152 and rotates the deadlock 40 counterclockwise as shown in FIG. 13. This rotates the deadlock out of the path of the cross bar 140 on the locking head so that the latter can be moved upwardly. For each door of a series of cells a second cam actuator member 158 is fixed to the release bar 44 which may be integral with the first cam member 154, and it has a cam surface 160 aligned with the upper cam follower 104 of the locking head 84. When the first cam member 154 engages the deadlock cam follower 152 the second cam member 158 shortly thereafter engages the upper cam follower 104 and raises the locking head 84.

A third cam actuator 162 is fixed to the release bar 44 within each door housing and has a sloped, leading edge surface 163 which is aligned with and thereby operable to engage a cam follower 164 that causes the motor drive assembly 42 to pivot about the pin 122 and the drive pinion 108 to disengage from the rack 60. This motor lift cam follower 164 is fixed to a bracket 166 that is attached to the end of the support plate 114 and extends upwardly, as shown in FIGS. 3 and 5. Since the cam follower 164 is located a substantial distance from the pivotal axis of the motor support plate 114, relatively little axial force on the release bar 44 is required to raise simultaneously all of the motor assemblies for the doors in a row of cells. The location of the motor lift cam relative to the follower 162 is such that the motor drive assembly for each door will be disengaged when the release bar 44 is moved to an intermediate position before the deadlock 40 and the door bolts 36 and 38 are unlocked.

When the emergency release bar is in its normally closed position with each door being operated independently, the motor assembly 42 of each door is retained in its proper position with the pinion and rack gears meshed by a hold-down bracket 168 that is fixed to the release bar. This bracket comprises a projecting arm portion 170 adjustably attached to the bracket by a pair of bolts 171 through vertical slotted holes and having a lower edge surface 172 that is positioned directly above the motor lift cam follower 164 when the door is in normal operating position. The leading end 174 of the lower edge surface of the projecting arm 170 is slightly beveled so that the hold-down bracket will pass smoothly over the cam follower even if the pinion and rack gears are not initially meshed properly and the follower is slightly raised. The hold-down bracket is attached to the release bar by a lost motion connection comprised of a pair of slots 176 in the bracket in each of which extends a stud 178 that is fixed to the release bar 44. Spaced from the end of the bracket 168 on the release bar is a smaller fixed bracket 180 in which is slidably retained an axial rod 182 that is threadedly connected at its other end to the hold-down bracket. A coiled spring 184 around the rod 182 extends between the smaller bracket 180 and a nut 186 on the rod, thereby yieldably urging the hold-down bracket 168 against the studs 178. The aforesaid arrangement allows the hold-down bracket to move parallel and relative to the release bar a limited amount and thereby affords a degree of resiliency and shock absorption which prevents any jamming of the hold-down brackets and the motor drive assemblies if their rack and pinion gears are not initially fully meshed when a release bar is moved back to the normal operating position. With the brackets 168 in their normal hold-down position the arm portion of each extends over the motor lift cam follower 162 and the engaged gears of each motor drive unit are held firmly together so that they operate smoothly with no bouncing as the doors are opened and closed.

Each housing front panel above a door in a series of cells has a keyhole 188 which is located to provide access to the shaft 128 extending from the pivotal axis of the deadlock from outside the cell. The shaft is adapted to receive a special key device which when inserted therein, can be used for manually rotating the deadlock 40. This rotation simultaneously unlocks the deadlock by causing the lower finger portion 144 thereof to swing up and engage the cross bar 140 and raise the connecting rod 82, thereby disengaging both the door bolts 36 and 38 (see FIG. 14).

The keyhole for each door is normally covered by a coverplate 190 that is attached to the end of the support plate 114 for the motor drive assembly 42. Thus, it is moved upward and away from the keyhole to leave it open when the release bar 44 is moved axially to an intermediate point to disengage the motor drive assembly from the rack of a particular door. By having the keyhole coverplate fixed to the pivotal motor support plate instead of directly to the release bar, the problem of misalignment of the coverplates and keyholes of a large number of cells due to expansion and contraction of the release bar caused by temperature changes, has been eliminated.

The operation of the present door opening and locking system should be readily apparent from the foregoing description, but it may be summarized briefly as follows:

When the system is operated electrically from the remote control station, the emergency release bar 44 is in its neutral position with all of its cam actuators disengaged. The hold-down brackets 168, however, are all in position so that their projecting arms 170 extend over the cam follower 164 of each motor drive assembly 42, thereby keeping the pinion and rack gears properly engaged and preventing the pinion from bouncing out of engagement during any opening or closing cycle. Each door is wired so that it can be separately controlled from the remote operating station by appropriate power signals to the drive motor. Cutoff switches (not shown) are employed in the conventional manner to interrupt the power to a motor 112 when the door has reached its fully opened or closed position. When a motor is energized, its output through its gear box 110 drives the pinion 108 and moves the rack 60 meshed therewith. When the door is initially closed, the rack moves first without the carriage 48 and the cam actuators 126 and 150 on the rack simultaneously operate to push the vertical connecting rod 82 up thereby uplocking both the top and bottom bolts 36 and 38 and to unlock the deadlock 40. As the rack continues its linear movement, it becomes locked to and thus moves the carriage 48 and the attached door 22 to the open position. Normal closing operation of the door takes place when the drive motor is merely reversed. When the rack is driven back to the door's closed position, the deadlock 40 rotates downwardly with its notch 134 engaging the cross bar 140, and the upper and lower 36 and 38 bolts of the connecting rod assume their normal locking position. A switch 192 is fixed to the housing wall 46 rearwardly from the deadlock 40 and is closed by the deadlock when the latter is in its proper locking position. This closes a circuit (not shown) to a light at the remote control station indicating to the monitor that the cell is properly locked.

If it is desired to open only one of the cells manually the emergency release bar 44 is moved to its intermediate position. This movement removes each bracket 168 back from its holddown position and causes each cam actuator 162 to disengage the motor drive assembly 42 from the rack 60 of each door, but it leaves the deadlock 40 and the other bolts 36 and 38 for each door in their locked position. It simultaneously opens the keyhole 188 in each door housing enabling the special key to be inserted to rotate the deadlock manually for the door in question. Use of the key on a particular door then removes the deadlock 40 and raises the connecting rod 82 to unlock the upper and lower bolts 36 and 38 thereby leaving that door free to be opened. Full axial movement of the release bar causes the two cam actuators 150 and 158 for all the doors to unlock the deadlock 40 and move the connecting rod up to unlock its bolts as previously described and shown in FIG. 13.

In our door operating and locking system, it is seen that when each door is closed it is secured by essentially four locking means, namely the upper and lower locking bolts, the meshed gears of the motor pinion and the rack, and the deadlock. If any tampering should occur on the connecting rod within a locking column, for example, at its bottom, an attempt to move the connecting rod upward would cause the cross bar of the locking head to be jammed within the deadlock notch and no appreciable upward movement could take place. The present invention thus provides a jail door operating and locking system having a high degree of security, as well as smooth, maintenance-free operation.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A system for operating from a remote control station one or more of a plurality of doors arranged substantially in alignment along a corridor comprising:
   a housing located above each door;
   a reversible drive means within each said housing for moving the door below linearly from an open to a closed position;
   a movable emergency release bar extending from the remote control station and through each said housing thereof;
   a vertical locking column adjacent each said door;
   a vertically movable locking head within said locking column;
   bolt means in each said housing fixed to said locking head and engageable with the door below to hold it in the closed position;
   a pivotal deadlock means for preventing vertical movement of said locking head and thereby preventing the unlocking of bolt means; and
   cam actuator means on said release bar for pivoting said deadlock means and for operating said locking head for each said door thereby unlocking all of said cell doors simultaneously when said release bar is moved axially.

2. The system as described in claim 1 wherein each said bolt means includes an upper bolt fixed to said locking head; a connecting rod attached to and extending downwardly from said locking head; and a lower bolt means operable by vertical movement of said connecting rod downwardly for projecting said lower bolt means outwardly from said locking column and locking the bottom end of each door.

3. The system as described in claim 1 wherein said locking head includes a cross bar member and said deadlock means within each said housing for holding said locking head in the bolt locking position comprises a block rotatably mounted on a shaft, a portion on one side of said block forming a notch having intersecting surfaces, said surfaces being adjacent one end of said cross bar when said deadlock is in the locked position and preventing the upward movement of said locking head unless the deadlock is rotated so that its notch moves ahead of said cross bar.

4. The device as described in claim 3 including a finger projection on said deadlock for engaging and lifting said locking head when said deadlock is rotated manually about said shaft by said cam actuator means.

5. The system as described in claim 1 wherein said drive means includes a reversible motor, a pinion driven by said motor, a gear rack attached to the top of said door and normally engaged by said pinion when said drive means is in the operable position.

6. The system as described in claim 5 including means providing for limited movement of said gear rack relative to said door, and cam means on said rack for unlocking said bolt means and said deadlock during said relative movement of the rack in the door opening direction.

7. The system as described in claim 6 including a carraige in said housing attached to said door;
   a rack locking arm pivotally attached to said carriage and engageable with said rack; and
   cam means in said housing for moving said rack locking arm upwardly to connect with and to disconnect it from said rack.

8. The system as described in claim 5 including:
   an elongated plate supporting said reversible motor and said pinion;
   means for pivotally supporting said plate at one end within said housing;
   a cam follower means fixed to said supporting plate near the end opposite from its pivotal axis; and
   cam actuator means on said release bar for engaging said cam follower on said support plate for disengaging said pinion and said gear rack when the release bar is moved axially so that the door can be opened manually.

9. The system as described in claim 8 including a key receiving member attached to said deadlock at its pivotal axis within each said housing and an aperture aligned with said key receiving member on said deadlock; and a coverplate attached to said motor drive assembly normally covering said aperture and operable to uncover said aperture when said motor drive assembly is disengaged by said release bar.

10. The system as described in claim 8 including:
    a hold-down bracket within each housing having a projecting arm portion that extends directly above said cam follower on said supporting plate when the pinion is normally engaged in said gear rack in driving position; and
    axially resilient means for connecting each said hold-down bracket to said mechanical release bar.

11. The system as described in claim 10 wherein said latter resilient means includes:
    a stud fixed to said release bar and slidable in a slot in said hold-down bracket; and
    spring means connecting said bracket to said release bar for providing a resilient lost motion connection between said bracket and said release bar and yieldably urging said bracket into its hold-down position.

12. The system as described in claim 3, including:
    an upper cam follower on each said locking head; and
    a second cam actuator on said release bar aligned with the other said upper cam follower for moving said locking head and said bolt means upward when said release bar is actuated.

13. An operating and locking system for a linearly moveable door comprising:
    an elongated housing located above the door;
    a reversible drive means within said housing for moving the door linearly from an open to a closed position;
    a movable bolt means engageable with said door for preventing movement thereof from a closed position;
    a rotatable deadlock means within said housing and operable in its locking position to prevent disengagement of said bolt means from said door; and
    means controllable from outside said housing for rotating said deadlock means to an unlocked position to facilitate unlocking said bolt means.

14. The system as described in claim 13 wherein said latter means comprises an elongated emergency release bar extending through said housing that is operable from a remote station, and a cam means on said release bar for engaging and unlocking said rotatable deadlock means when said bar is moved longitudinally.

15. An operating and locking system for a linearly movable door comprising:
    a housing located above the door;
    a gear rack attached to the upper end of the door extending into said housing;
    a drive assembly in said housing including an electric motor and a pinion driven by said motor;
    a base member supporting said drive assembly so that said pinion is aligned and meshed with said gear rack when said assembly is in the door operating position;
    mounting means for pivotally connecting one end of said base member to said housing and including a releasable means for disconnecting said base member from said housing for quick replacement or servicing of said drive assembly.

16. The system as described in claim 15 wherein said mounting means includes a bracket fixed to said housing, bushing means fixed to said bracket, and a releasable pin means journaled in said base member and extending through said bushing means.

17. A system for operating a linearly movable door comprising:
   a housing located above the door and having an opening thereto on one side;
   an emergency release bar extending through said housing from a remote operating station;
   a manually operable lock means within said housing and aligned with said opening;
   cover means normally located over said opening and movably connected to said housing; and
   means on said release bar for moving said cover means relative to said housing to provide access thereto through said opening to permit actuation of said lock means.

18. The system as described in claim 17 wherein said lock means includes a bolt engageable with the door for preventing linear movement thereof in the closed position; and a pivotal deadlock for preventing the unlocking of said bolt in one position and for disengaging the bolt when moved to another position.

19. The system as described in claim 17 wherein said cover means comprises a plate; support means for said cover means pivotally connected at one end to said housing and having a cam follower attached near its opposite end; said means on said release bar for moving said cover means comprising a cam member aligned with said cam follower and thereby operable for moving said support means and said cover plate away from said opening when said release bar is moved.

20. In a prison facility including a plurality of cells having their doors aligned along a corridor, each cell having an elongated housing above its door with each door being mounted on a carriage that is movable linearly within its housing, and an emergency release rod extending from a remote control station near the row of cells through each of said housings, a door operating and locking system for each said door comprising in combination:
   a reversible drive means within each said housing for moving the door below linearly from an open to a closed position;
   a vertical locking column adjacent the door;
   a connecting rod within said locking column;
   a locking head fixed to the upper end of said connecting rod and extending into said housing;
   an upper bolt means fixed to said locking head and operable to prevent linear movement of said carriage from the door closed position when the connecting rod is in its down position;
   a pivotal lower bolt means fixed to the lower end of said connecting rod and operable to extend outwardly from said locking column when said connecting rod is in the down position;
   a pivotal deadlock means having a notch for engaging said locking head to prevent upward movement of said connecting rod from its down position; and
   cam means on said release bar for engaging and pivoting said deadlock means out of its locking position and for moving said connecting rod upwardly, whereby all of said cell doors are unlocked simultaneously when said release bar is moved axially.

21. The system as described in claim 20 wherein said reversible drive means comprises:
   a gear rack attached to said door carriage;
   a reversible motor;
   a pinion gear driven by said pinion and meshed with said gear rack;
   means for providing a limited amount of linear movemean of said gear rack on its said carriage; and
   cam means on said gear rack for raising said connecting rod and unlocking said upper and lower bolts and for releasing said deadlock means when said rack is moved prior to movement of said carriage.

22. The system as described in claim 20 wherein said deadlock means is rotatably mounted on a shaft within said housing, and a cross bar on said locking head having a corner portion located within said notch and thereby retained by said deadlock when the connecting rod is in the down and locking position, said shaft of said deadlock being positioned so that it will move past said cross bar when said deadlock is rotated by an external means.

References Cited

UNITED STATES PATENTS

| | | | |
|---|---|---|---|
| 2,841,252 | 7/1958 | Adam | 49—16 |
| 3,082,847 | 3/1963 | Young | 49—16 |
| 3,271,901 | 9/1966 | Bednar | 49—16 |

DAVID J. WILLIAMOWSKY, *Primary Examiner.*

J. KARL BELL, *Assistant Examiner.*

U.S. Cl. X.R.

49—18, 24, 28, 139, 280